US012756289B2

(12) United States Patent
Hashimoto

(10) Patent No.: US 12,756,289 B2
(45) Date of Patent: Oct. 6, 2026

(54) STATE DETECTION DEVICE, SEMICONDUCTOR INTEGRATED CIRCUIT DEVICE AND VEHICLE

(71) Applicant: ROHM CO., LTD., Kyoto (JP)

(72) Inventor: Ken Hashimoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 269 days.

(21) Appl. No.: 18/470,806

(22) Filed: Sep. 20, 2023

(65) Prior Publication Data

US 2024/0113613 A1 Apr. 4, 2024

(30) Foreign Application Priority Data

Sep. 30, 2022 (JP) ................................ 2022-157348

(51) Int. Cl.
*H02M 1/00* (2007.01)
*G05F 1/565* (2006.01)
(Continued)

(52) U.S. Cl.
CPC .......... *H02M 1/0045* (2021.05); *G05F 1/565* (2013.01); *G05F 1/575* (2013.01); *H02M 3/158* (2013.01)

(58) Field of Classification Search
CPC ..... H02M 1/0045; H02M 3/158; G05F 1/565; G05F 1/56; G05F 1/575; H01L 23/544; G01R 31/64; G01R 31/00; G01R 31/40
See application file for complete search history.

(56) References Cited

U.S. PATENT DOCUMENTS 5,804,973 A * 9/1998 Shinohara ............... B60L 50/60 324/548
9,097,747 B2 * 8/2015 Ikeda ....................... G01D 5/24
(Continued)

FOREIGN PATENT DOCUMENTS

CN 101228048 B * 6/2010 ............ B60L 3/0076
CN 102075086 B * 12/2014 ............ G01R 31/64
(Continued)

OTHER PUBLICATIONS

Machine Translation CN_102075086_B (Year: 2011).*
(Continued)

*Primary Examiner* — Thienvu V Tran
*Assistant Examiner* — Yahveh Comas Torres
(74) *Attorney, Agent, or Firm* — Fish & Richardson P.C.

(57) ABSTRACT

The present disclosure provides a state detection device, which is designed in a power supply circuit including a feedback control unit configured to perform feedback control based on a difference between a feedback voltage corresponding to an output voltage and a reference voltage; and an output capacitor configured to smooth the output voltage. The state detection device is configured to detect a state of the output capacitor. The state detection device includes target value varying unit and a detector. The target value varying unit is configured to increase a target value of the output voltage. The detector is configured to detect the state of the output capacitor based on a change in the output voltage while the output capacitor is being charged as the target value of the output voltage rises or while the output capacitor is being discharged after the target value of the output voltage rises.

6 Claims, 5 Drawing Sheets

(51) Int. Cl.
*G05F 1/575* (2006.01)
*H02M 3/158* (2006.01)

(56) References Cited

U.S. PATENT DOCUMENTS

| | | | | | |
|---|---|---|---|---|---|
| 9,188,633 | B2 * | 11/2015 | Shimizu | G01R 31/30 | |
| 9,599,644 | B2 * | 3/2017 | Katsuki | G01R 19/16595 | |
| 9,600,005 | B2 * | 3/2017 | Hayashi | G05F 1/56 | |
| 9,755,527 | B2 * | 9/2017 | Kawashima | H02M 3/33507 | |
| 10,620,247 | B2 * | 4/2020 | Ou Yang | H02M 3/157 | |
| 11,431,244 | B2 * | 8/2022 | Ma | H02M 3/158 | |
| 11,680,995 | B2 * | 6/2023 | Kraus | G01R 31/64 | 324/548 |
| 2005/0077882 | A1 * | 4/2005 | Nishino | H02M 3/156 | 323/222 |
| 2005/0184786 | A1 * | 8/2005 | Nishikawa | H03K 5/13 | 327/276 |
| 2012/0195075 | A1 * | 8/2012 | Nate | H02M 3/33553 | 363/21.01 |
| 2015/0205314 | A1 * | 7/2015 | Hayashi | G05F 1/56 | 323/217 |
| 2017/0149339 | A1 * | 5/2017 | Kawashima | H02M 3/33507 | |
| 2017/0222557 | A1 * | 8/2017 | Crawley | G01R 19/0038 | |
| 2019/0064245 | A1 * | 2/2019 | Chiang | G01R 31/52 | |
| 2019/0094279 | A1 * | 3/2019 | Ou Yang | H02M 3/157 | |
| 2020/0212906 | A1 * | 7/2020 | Mukunoki | G01R 31/2812 | |
| 2021/0050776 | A1 * | 2/2021 | Ma | H02J 7/345 | |

FOREIGN PATENT DOCUMENTS

| | | | | | |
|---|---|---|---|---|---|
| CN | 104322144 | A | * | 1/2015 | H01L 25/167 |
| JP | H08-80055 | A | | 3/1996 | |
| JP | 2003-204681 | A | | 7/2003 | |
| JP | 2008-066390 | A | | 3/2008 | |
| JP | 2010-107405 | A | | 5/2010 | |
| JP | 2011-174797 | A | | 9/2011 | |
| JP | 2012-150053 | | | 8/2012 | |
| JP | 2016-208773 | A | | 12/2016 | |
| JP | 2019-060842 | A | | 4/2019 | |

OTHER PUBLICATIONS

Machine Translation CN_101228048 (Year: 2010).*

Machine Translation CN_104322144_A (Year: 2015).*

Machine translation CN-101228048-B (Year: 2006).*

JP OA—Japanese Patent Office, Office Action in Japanese Appln. No. 2022-157348, dated May 12, 2026, 44 pages (with English Translation).

* cited by examiner

STATE DETECTION DEVICE, SEMICONDUCTOR INTEGRATED CIRCUIT DEVICE AND VEHICLE

TECHNICAL FIELD

The present disclosure relates to a state detection device, a semiconductor integrated circuit device having the state detection device, and a vehicle having the semiconductor integrated circuit device.

BACKGROUND

In the recent years, vehicle integrated circuits (ICs) are required to comply with ISO26262 (international standards related to functional safety associated with electricity/electronics of vehicles). Therefore, there is a need for a mechanism that detects malfunction of an output capacitor of a vehicle power IC.

A malfunction detection device described in patent publication 1 stops a switch regulator, and reduces charge accumulated in the output capacitor of the switch regulator, so as to detect malfunction of the output capacitor of the switch regulator.

PRIOR ART DOCUMENT

Patent Publication

[Patent document 1] Japan Patent Publication No. 2012-150053

DETAILED DESCRIPTION OF THE EMBODIMENTS

In the present disclosure, a metal oxide semiconductor (MOS) transistor refers to a field effect transistor in which a gate is structured to have at least three layers including "a layer containing a conductor or a semiconductor such as polysilicon with a small resistance value", "an insulating layer", and "a P-type, N-type or intrinsic semiconductor layer". That is to say, the gate structure of the MOS transistor is not limited to the structure of the three layers including metal, oxide and semiconductor.

In the present disclosure, a reference voltage refers to a constant voltage in an ideal state, and is in practice a voltage slightly variable in response to temperature changes.

In the present disclosure, a constant voltage refers to a constant voltage in an ideal state, and is in practice a voltage slightly variable in response to temperature changes.

First Embodiment

Figure 1:
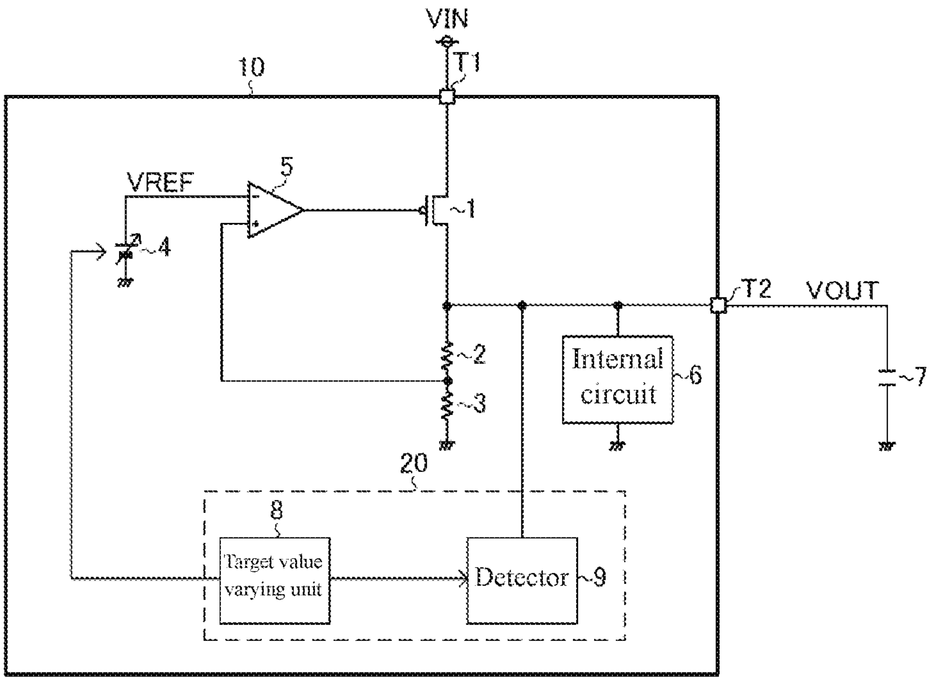
FIG. 1 is a diagram of a brief configuration of a semiconductor integrated circuit device according to a first embodiment.

FIG. 1 shows a diagram of a brief configuration of a semiconductor integrated circuit device according to a first embodiment. A semiconductor integrated circuit device 10 shown in FIG. 1 is a so-called power integrated circuit (IC). The semiconductor integrated circuit device 10 includes terminals T1 and T2, a P-channel MOS transistor 1, resistors 2 and 3, a reference voltage source 4, an error amplifier 5, an internal circuit 6 and a state detection device 20. The state detection device 20 includes a target value varying unit 8 and a detector 9.

An input voltage VIN is applied to the terminal T1. An output capacitor 7 is externally connected to the terminal T2. A first terminal of the output capacitor 7 is connected to the terminal T2 outside the semiconductor integrated circuit device 10, and a second terminal of the output capacitor 7 is connected to a ground potential outside the semiconductor integrated circuit device 10. The output capacitor 7 smooths an output voltage VOUT generated in the terminal T2.

The internal configuration of the semiconductor integrated circuit device 10 is described below. A source of the MOS transistor 1 is connected to the terminal T1. A drain of the MOS transistor 1 is connected to a first terminal of the resistor 2, the terminal T2, the internal circuit 6 and the detector 9. The internal circuit 6 is also connected to the ground potential.

A second terminal of the resistor 2 is connected to a first terminal of the resistor 3 and a non-inverting input terminal of the error amplifier 5. A second terminal of the resistor 3 is connected to the ground potential. An anode of the reference voltage source 4 is connected to an inverting input terminal of the error amplifier 5. A cathode of the reference voltage source 4 is connected to the ground potential. A reference voltage VREF is supplied from the reference voltage source 4 to the inverting input terminal of the error amplifier 5. An output signal of the error amplifier 5 is supplied to a gate of the MOS transistor 1. The resistors 2 and 3, the reference voltage source 4 and the error amplifier 5 form a feedback control unit. The feedback control unit performs a feedback control based on a difference between a feedback voltage (divided voltage of the output voltage VOUT) corresponding to the output voltage VOUT and the reference voltage VREF.

The MOS transistor 1, the resistors 2 and 3, the reference voltage source 4, the error amplifier 5 and the output capacitor 7 form a linear regulator. The linear regulator includes the P-channel MOS transistor 1 between the terminal T1 and the terminal T2 and hence has a source capability, and the resistors 2 and 3 used as a voltage dividing circuit are highly resistive and hence do not have any source capability. The state detection device 20 uses the above feature of the linear regulator to detect the state of the output capacitor 7.

The target value varying unit 8 causes a target value of the output voltage VOUT to rise. In this embodiment, by controlling the reference voltage source 4, the target value varying unit 8 causes the reference voltage VREF output from the reference voltage source 4 to rise, thereby causing the target value of the output voltage VOUT to rise. Moreover, details associated with shifting of the target value of the output voltage VOUT are described below.

The detector 9 detects the state of the output capacitor 7 based on a change in the output voltage VOUT during discharging of the output capacitor 7 after the target value of the output voltage VOUT rises.

Figure 2:
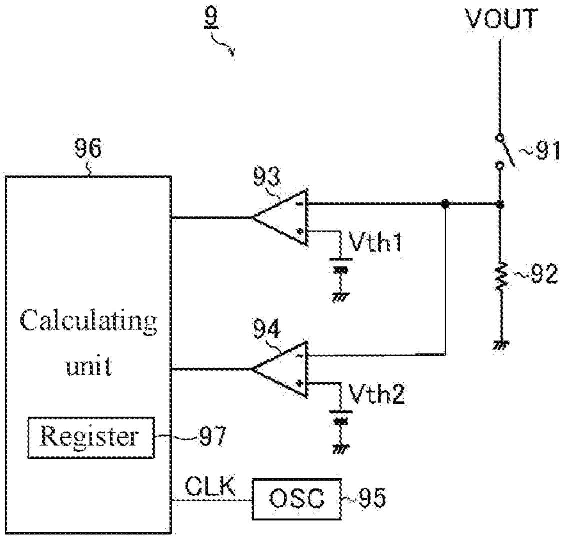
FIG. 2 is a diagram of a configuration example of a detector.

FIG. 2 shows a diagram of a configuration example of a detector 9. The detector 9 of the configuration example shown in FIG. 2 includes a switch 91, a resistor 92, comparators 93 and 94, an oscillator 95 and a calculation unit 96. The calculation unit 96 is built in with a register 97.

The output voltage VOUT is applied to a first terminal of the switch 91. A second terminal of the switch 91 is connected to a first terminal of the resistor 92, an inverting input terminal of the comparator 93 and an inverting input terminal of the comparator 94. On/off of the switch 91 is controlled by the target value varying unit 8.

A second terminal of the resistor 92 is connected to the ground potential. A constant voltage, that is, a first threshold voltage Vth1, is applied to a non-inverting input terminal of the comparator 93, and a constant voltage, that is, a second threshold voltage Vth2 (<Vth1) is applied to a non-inverting input terminal of the comparator 94. Output signals of the comparators 93 and 94 are supplied to the calculation unit 96. The oscillator 95 outputs a clock signal CLK to the calculation unit 96.

During an on period of the switch 91, the calculation unit 96 starts measuring a discharge time by using the clock signal CLK when the output signal of the comparator 93 switches from a low level to a high level, and stops measuring the discharge time when the output signal of the comparator 94 switches from a low level to a high level. That is to say, the calculation unit 96 measures the discharge time for the output voltage VOUT to reach the second threshold voltage Vth2 from the first threshold voltage Vth1.

The calculation unit 96 stores in advance a time constant of an RC circuit including the resistor 92 and the output capacitor 7, and detects (calculates) a capacitance of the output capacitor from the discharge time and the time constant of the RC circuit.

Moreover, it is desired that the internal circuit 6 is in a stop state during the discharge time. Accordingly, the detection (calculation) precision of the capacitance of the output capacitor is enhanced.

In addition, the detection (calculation) of the capacitance of the output capacitor can also be omitted, and the state (for example, normal or abnormal) of the output capacitor is detected from the discharge time. In this case, it is also desired that the internal circuit 6 is in a stop state during the discharge time.

Moreover, the detector 9 can perform a periodic detection and store detection results in the register 97. The calculation unit 96 can detect the state of the output capacitor 7 based on a history (for example, a comparison between the current detection result and a previous detection result) of the detection results. In this case, even if the precision of an absolute value of the capacitance of the output capacitor 7 calculated by the calculation unit 96 is low, the calculation unit 96 is still capable of correctly detecting the change in the capacitance of the output capacitor 7.

Figure 3:
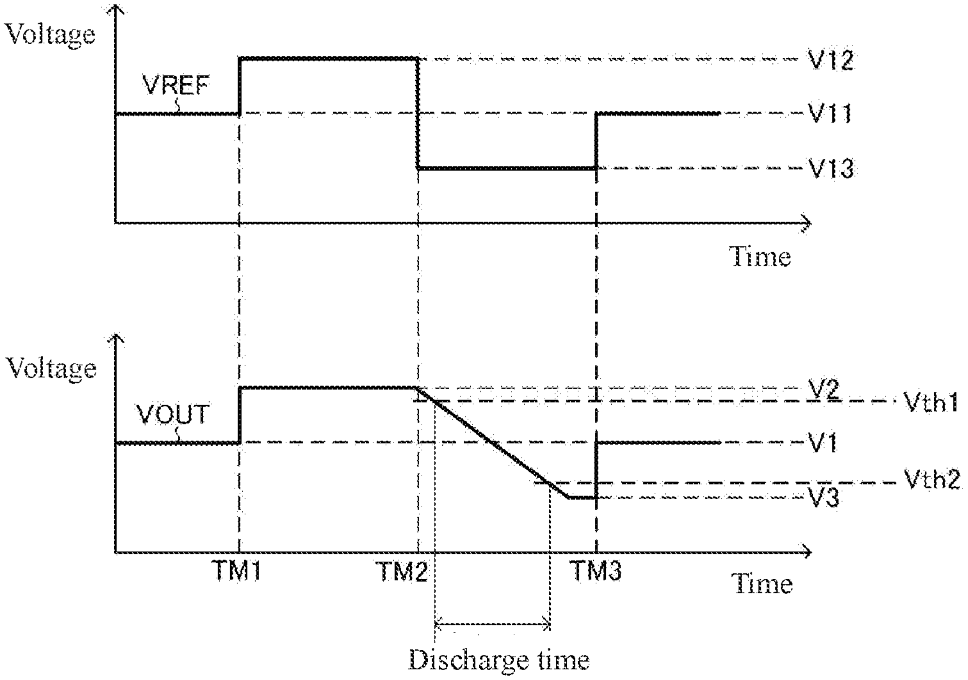
FIG. 3 is a diagram of waveforms of a reference voltage and an output voltage.

FIG. 3 shows a diagram of waveforms of the reference voltage VREF and the output voltage VOUT. In FIG. 3, the vertical axis represents voltage and the horizontal axis represents time.

Usually (during a period in which the detection of the state detection device 20 is not performed), the reference voltage VREF is set to a voltage V11 by the target value varying unit 8, and the target value of the output voltage VOUT becomes a first value V1.

At a moment TM1 when the state detection device 20 starts detection, the reference voltage VREF switches from the voltage V11 to a voltage V12 (>V11) via the target value varying unit 8, and the target value of the output voltage VOUT rises from the first value V1 to a second value V2 (>V1). At this point in time, the output voltage VOUT drastically rises to the second value V2 because of the source capability of the MOS transistor 1.

At a moment TM2 after a constant time has elapsed from the moment TM1, the reference voltage VREF switches from the voltage V12 to a voltage V13 (<V11) via the target value varying unit 8. Accordingly, the target value of the output voltage VOUT drops from the second value V2 to a third value V3 (<V1). Moreover, at the moment TM2, the switch 91 is turned on.

At a moment TM3 after a constant time has elapsed from the moment TM2, the reference voltage VREF switches from the voltage V13 to the voltage V11 via the target value varying unit 8. Accordingly, the target value of the output voltage VOUT returns to the first value V1. Moreover, at the moment TM3, the switch 91 is turned off. The moment TM3 is a moment at which the state detection device 20 stops the detection.

In a period from the moment TM2 to the moment TM3, due to the lack of a synchronization capability of the resistors 2 and 3, the output voltage VOUT gradually drops because of discharging of the resistor 92. In addition, the feedback control unit controls the MOS transistor 1 such that the output voltage VOUT is not lower than the third value V3.

Thus, the second value V2 is set to be a value equal to or slightly less than an upper limit of an operation range of a load (the internal circuit 6 in this embodiment) connected to the linear regulator, and the third value V3 is set to a value equal to or slightly greater than a lower limit of an operation range of the load (the internal circuit 6 in this embodiment) connected to the linear regulator. Accordingly, the load (the internal circuit 6 in this embodiment) connected to the linear regulator is prevented from falling into malfunction.

For example, a communication terminal can be disposed at the semiconductor integrated circuit device 10, and the detection results of the state detection device 20 can be output to the outside of the semiconductor integrated circuit device 10 via the communication terminal.

Moreover, different from this embodiment, the target value of the output voltage VOUT can also directly return to the first value V1 from the second value V2. However, in this case, the difference between the first threshold voltage Vth1 and the second threshold voltage Vth2 cannot be increased, and the precision of the absolute value of the capacitance of the output capacitor 7 calculated by the calculation unit 96 is degraded. Thus, as this embodiment, it is desired that the target value of the output voltage VOUT returns from the second value V2 to the first value V1 via the third value V3.

Second Embodiment

Figure 4:
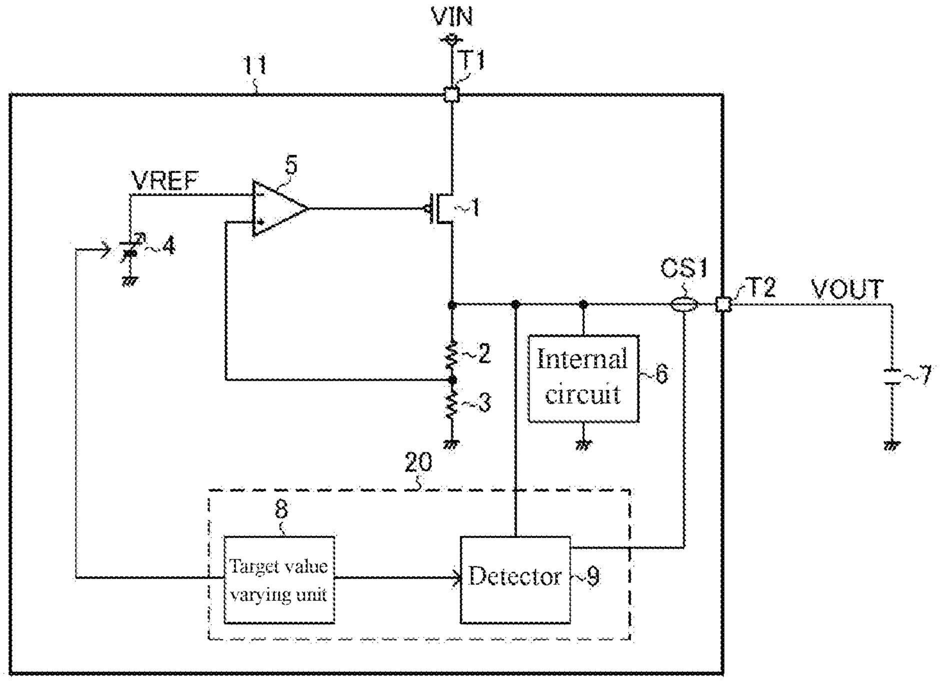
FIG. 4 is a diagram of a brief configuration of a semiconductor integrated circuit device according to a second embodiment.

FIG. 4 shows a diagram of a brief configuration of a semiconductor integrated circuit device according to a second embodiment. In FIG. 4, the description for the same parts in FIG. 1 denoted with the same numerals or symbols is omitted for brevity.

Similar to a configuration example of the detector 9 disposed in the semiconductor integrated circuit device 10 of the first embodiment, a configuration example of the detector 9 disposed in a semiconductor integrated circuit device 11 shown in FIG. 4 is the configuration shown in FIG. 2.

The semiconductor integrated circuit device 11 shown in FIG. 4 is a configuration in which a current sensor CS1 is added to the semiconductor integrated circuit device 10 of the first embodiment. The current sensor CS1 is, for example, a sensing resistor disposed between the terminal T2 and the detector 9. The detector 9 obtains the magnitude of a current flowing through the sensing resistor based on a potential difference between two terminals of the sensing resistor. Moreover, in addition to being used as a resistor for discharging, the resistor 92 (referring to FIG. 2) can further be used as a sensing resistor serving as the current sensor CS1.

The current sensor CS1 monitors a discharge current of the output capacitor 7 when the switch 91 (referring to FIG. 2) is turned on.

In this embodiment, the calculation unit 96 calculates (detects) the capacitance of the output capacitor 7 based on the discharge time of the output capacitor 7 and a discharge current of the output capacitor 7 monitored by the current sensor CS1.

Comparing this embodiment with the first embodiment, the precision of the absolute value of the capacitance of the output capacitor 7 calculated by the calculation unit 96 is enhanced.

Third Embodiment

Figure 5:
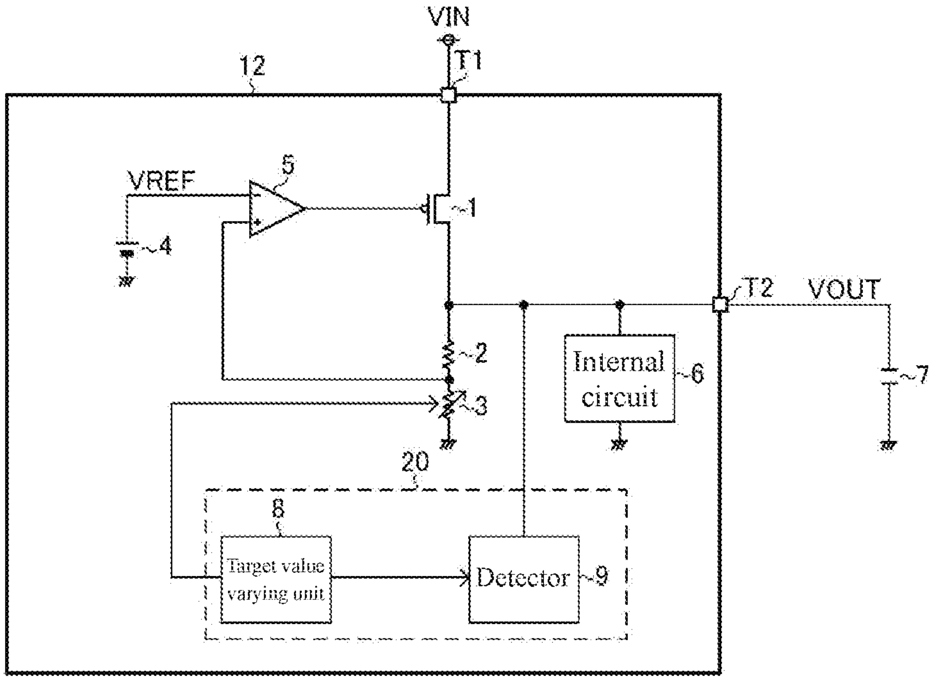
FIG. 5 is a diagram of a brief configuration of a semiconductor integrated circuit device according to a third embodiment.

FIG. 5 shows a diagram of a brief configuration of a semiconductor integrated circuit device according to a third embodiment. In FIG. 5, the description for the same parts in FIG. 1 denoted with the same numerals or symbols is omitted for brevity.

Similar to a configuration example of the detector 9 disposed in the semiconductor integrated circuit device 10 of the first embodiment, a configuration example of the detector 9 disposed in a semiconductor integrated circuit device 12 shown in FIG. 5 is the configuration shown in FIG. 2.

A semiconductor integrated circuit device 12 shown in FIG. 5 differs from the semiconductor integrated circuit device 10 of the first embodiment in the aspect that the target value varying unit 8 controls the resistor 3 instead of the reference voltage source 4, and is the same as the semiconductor integrated circuit device 10 of the first embodiment in other aspects.

In the semiconductor integrated circuit device 12 shown in FIG. 5, the resistor 3 is a variable resistor but not a fixed resistor. The target value varying unit 8 reduces a resistance value of the resistor 3 by controlling the resistance value of the resistor 3, so as to cause the target value of the output voltage VOUT to rise.

Moreover, different from this embodiment, in a configuration, the resistor 2 can also be a variable resistor and the resistor 3 can be a fixed resistor, and the resistance value of the resistor 2 can be controlled by the target value varying unit 8; or in another configuration, the resistors 2 and 3 can be variable resistors, and the resistance values of the resistors 2 and 3 can be controlled by the target value varying unit 8.

<Use>

Figure 6:
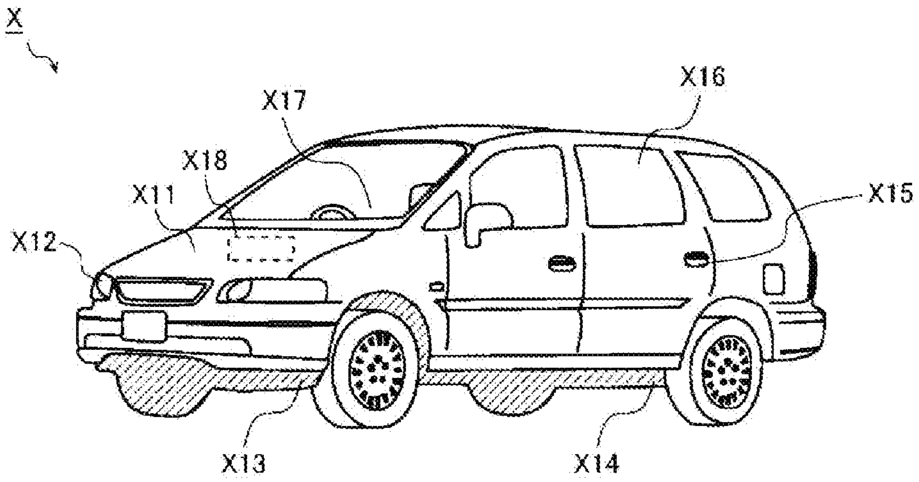
FIG. 6 is a diagram of an appearance of a configuration example of a vehicle.

Next, examples of use of the semiconductor integrated circuit devices 10 to 12 described above are given below. FIG. 6 shows a diagram of an appearance of a configuration example of a vehicle mounted with vehicle devices. A vehicle X of this configuration example is mounted with vehicle devices X11 to X17, and a battery (not shown) powering these vehicle devices X11 to X17.

The vehicle device X11 is an engine control unit that performs engine-related control (injection control, electronic throttle control, idle speed control, oxygen sensor heater control, and automatic cruise control).

The vehicle device X12 is a lamp control unit that performs dimming and lighting control of a high intensity discharged lamp (HID) or a daytime running lamp (DRL).

The vehicle device X13 is a transmission device control unit that performs control related to a transmission device.

The vehicle device X14 is a vehicle body control unit that performs motion-related control of the vehicle X such as anti-lock brake system (ABS) control, electric power steering control and electronic shock absorption control.

The vehicle device X15 is a safety control unit that performs driving control such as door lock and antitheft alarm.

The vehicle device X16 is, for example, an electronic apparatus such as a wiper, a power rearview mirror, a power window, a power sunroof, a power seat, or the air conditioner, which is installed in the vehicle X at the factory delivery stage as standard accessories or accessories according to manufacturer options.

The vehicle device X17 is, for example, an electronic apparatus such as a vehicle audiovisual (AV) device, car navigation system, and electronic toll collection (ETC) system, which can be mounted in the vehicle X according to a user option as desired.

Moreover, each of the semiconductor integrated circuit devices 10 to 12 described above can be assembled together with the output capacitor 7 in any one of the vehicle devices X11 to X17.

<Other>

Various modifications may be appropriately made to the embodiments of the present disclosure within the scope of the technical concept of the claims. As such, the various embodiments provided in the description may be appropriately implemented in combination given that no contradictions are incurred. The embodiments above are only examples of possible implementations of the present disclosure, and the meanings of the terms of the present disclosure or the constituents are not limited to the meanings of the terms recited in the embodiments above.

In the embodiments, the state detection device 20 is disposed in a linear regulator, but may also be disposed in a power supply circuit other than a linear regulator. A power supply circuit other than a linear regulator is, for example, a boost switch regulator or a charge pump circuit.

In the embodiments, the output capacitor 7 is externally connected to each of the semiconductor integrated circuit devices 10 to 12; however, the output capacitor 7 can also be built in in each of the semiconductor integrated circuit devices 10 to 12.

In the embodiments, the detector 9 detects the state of the output capacitor 7 based on the discharge time of the output capacitor 7, but it can also detect the state of the output capacitor 7 based on a charge time of the output capacitor 7. However, since the linear regulator has a source capability, a charge speed of the output capacitor 7 is greater than a discharge speed of the output capacitor 7. Thus, it is easier to detect the state of the output capacitor 7 based on the discharge time of the output capacitor 7 than to detect the state of the output capacitor 7 based on the charge time of the output capacitor 7.

In the configuration example shown in FIG. 2, the detector 9 is configured to include the comparators 93 and 94;

however, an analog-to-digital converter (ADC) that performs Analog/Digital (A/D) conversion on the output voltage VOUT can also be disposed in substitution for the comparators 93 and 94, and the output voltage VOUT converted to a digital value by the ADC is then compared with each of the first threshold voltage Vth1 and the second threshold voltage Vth2 by digital processing in the calculation unit 96.

Moreover, in the configuration example shown in FIG. 2, the detector 9 detects the state of the output capacitor 7 based on the discharge time for the output voltage VOUT to reach the second threshold voltage Vth2 from the first threshold voltage Vth1; however, the detector 9 can also detect the state of the output capacitor 7 based on the change in the output voltage VOUT during a constant discharge time.

Figure 7:
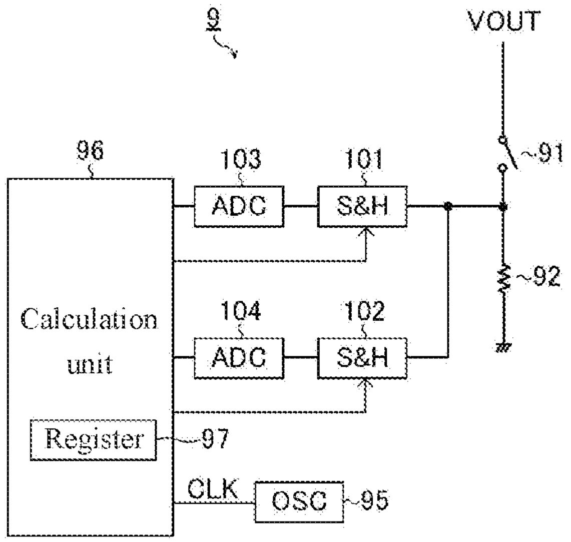
FIG. 7 is a diagram of another configuration example of a detector.
Figure 8:
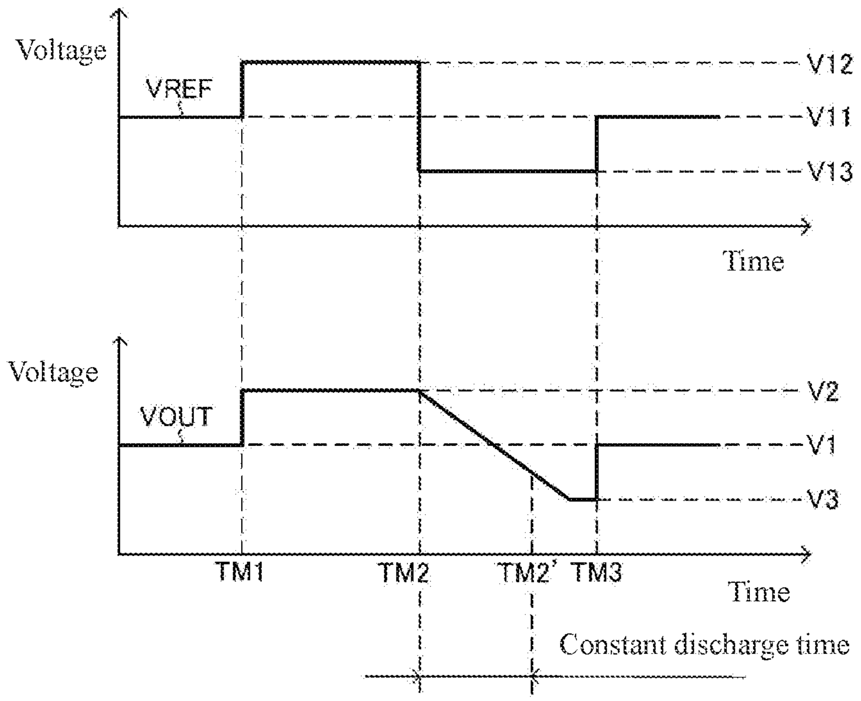
FIG. 8 is a diagram of waveforms of a reference voltage and an output voltage.

FIG. 7 shows a configuration example of the detector 9 that detects the state of the output capacitor 7 based on the change in the output voltage VOUT during a constant discharge time. FIG. 8 shows a diagram of waveforms of the reference voltage VREF and the output voltage VOUT when the detector 9 of the configuration example shown in FIG. 7 is used. The detector 9 of the configuration example shown in FIG. 7 is configured to include sample and hold circuits 101 and 102 and ADCs 103 and 104 in substitution for the comparators 93 and 94 of the configuration example shown in FIG. 2. Moreover, a switch that alternatively selects the outputs of the sample and hold circuits 101 and 102 can also be provided and only one ADC is disposed, and the output of either of the sample and hold circuits 101 and 102 is supplied to the ADC through the switch.

In the detector 9 of the configuration example shown in FIG. 7, the calculation unit 96 causes the sample and hold circuit 101 to store a value of the output voltage VOUT at the moment TM2 at which the switch 91 is turned on. Moreover, the value of the output voltage VOUT at the moment TM2 is substantially equal to the value of the output voltage VOUT in a period after the moment TM1 and before the moment TM2. Thus, the sample and hold circuit 101 can store the value of the output voltage VOUT in the period after the moment TM1 and before the moment TM2 in substitution for the value of the output voltage VOUT at the moment TM2.

In the detector 9 of the configuration example shown in FIG. 7, the calculation unit 96 obtains, by using the clock signal CLK, a moment TM2' (referring to FIG. 8) after a constant discharge time has elapsed from the moment TM2, such that the sample and hold circuit 102 stores the value of the output voltage VOUT at the moment TM2'.

After the moment TM3 at which the switch 91 is turned off, the ADC 103 performs A/D conversion on the value of the output voltage VOUT at the moment TM2 stored by the sample and hold circuit 101. Similarly, after the moment TM3 at which the switch 91 is turned off, the ADC 104 performs A/D conversion on the value of the output voltage VOUT at the moment TM2' stored by the sample and hold circuit 102. As such, the ADCs 103 and 104 perform A/D conversion at moments at which there is no change in the output voltage VOUT, and accordingly, even if the output voltage VOUT serves as the power supply voltages of the ADCs 103 and 104 or the reference voltage and is used, the ADCs 103 and 104 are capable of stably performing A/D conversion.

The calculation unit 96 detects (calculates) the capacitance of the output capacitor based on the change in the output voltage VOUT during the constant discharge time obtained based on the outputs of the ADCs 103 and 104 and the time constant of the RC circuit including the resistor 92 and the output capacitor 7. Moreover, in the second or third embodiment, the detector 9 of the configuration example shown in FIG. 7 can also be used in substitution for the detector 9 of the configuration example shown in FIG. 2.

<Note>

A note is attached to the present disclosure to show specific configuration examples of the embodiments above.

A state detection device (20) of the present disclosure is configured as (a first configuration), being disposed in a power supply circuit including a feedback control unit (2 to 5) configured to perform a feedback control based on a difference between a feedback voltage corresponding to an output voltage and a reference voltage and an output capacitor (7) configured to smooth the output voltage, the state detection device configured to detect a state of the output capacitor and comprising: a target value varying unit (8), configured to increase a target value of the output voltage; and a detector (9), configured to detect the state of the output capacitor based on a change in the output voltage while the output capacitor is charged when the target value of the output voltage increases; or while the output capacitor is discharged after the target value of the output voltage increases.

The state detection device of the first configuration can also be configured as (a second configuration), wherein after the target value of the output voltage increases from a first value, the detector is configured to return the target value of the output voltage to the first value.

The state detection device of the second configuration can also be configured as (a third configuration), wherein after the target value of the output voltage increases from the first value, the detector is configured to decrease the target value of the output voltage to a value less than the first value and then return the target value of the output voltage to the first value.

The state detection device of any one of the first to third configurations can also be configured as (a fourth configuration), wherein the detector is configured to detect the state of the output capacitor based on the change in the output voltage during a constant discharge time.

The state detection device of any one of the first to third configurations can also be configured as (a fifth configuration), wherein the detector is configured to detect the state of the output capacitor based on a discharge time for the output voltage to reach a second threshold voltage less than a first threshold voltage from the first threshold voltage.

The state detection device of any one of the first to third configurations can also be configured as (a sixth configuration), wherein the detector is configured to detect the state of the output capacitor based on a charge time of the output capacitor.

The state detection device of any one of the first to sixth configurations can also be configured as (a seventh configuration), wherein the detector is configured to perform a periodic detection and detect the state of the output capacitor based on a history of detection results.

The state detection device of the fourth or fifth configuration can also be configured as (an eighth configuration), comprising a current sensor configured to monitor a discharge current of the output capacitor, wherein the detector is configured to detect a capacitance of the output capacitor further based on a monitor result of the current sensor.

A semiconductor integrated circuit device (10 to 12) of the present disclosure is configured as (a ninth configuration) comprising: the state detection device of any one of the first to eighth configurations; and at least a part of the power supply circuit.

The semiconductor integrated circuit device of the ninth configuration can also be configured as (a tenth configuration), further comprising: an internal circuit (6), configured to receive the output voltage; and an RC circuit, including a resistor (92) and the output capacitor, wherein the state detection device is the state detection device of the fourth or fifth configuration, the internal circuit is configured to be in a stop state during the discharge time, and the detector is configured to detect a capacitance of the output capacitor also based on a time constant of the RC circuit.

A vehicle (X) of the present disclosure is configured as (an eleventh configuration), comprising the semiconductor integrated circuit device of the ninth or tenth configuration.

The invention claimed is:

1. A state detection device, which is disposed in a power supply circuit including a feedback control unit configured to perform a feedback control based on a difference between a feedback voltage corresponding to an output voltage and a reference voltage and an output capacitor configured to smooth the output voltage, the state detection device configured to detect a state of the output capacitor and comprising: a target value varying unit, configured to increase a target value of the output voltage;

a detector, configured to detect the state of the output capacitor based on a change in the output voltage, while the output capacitor is charged when the target value of the output voltage increases or while the output capacitor is discharged after the target value of the output voltage increases;

wherein the detector is configured to detect the state of the output capacitor based on a discharge time for the output voltage to reach a second threshold voltage less than a first threshold voltage from the first threshold voltage;

and a current sensor configured to monitor a discharge current of the output capacitor, wherein the detector is configured to detect a capacitance of the output capacitor further based on a monitor result of the current sensor.

2. The state detection device of claim 1, wherein after the target value of the output voltage increases from a first value, the detector is configured to return the target value of the output voltage to the first value.

3. The state detection device of claim 2, wherein after the target value of the output voltage increases from the first value, the detector is configured to decrease the target value of the output voltage to a value less than the first value and then return the target value of the output voltage to the first value.

4. The state detection device of claim 1, wherein the detector is configured to perform a periodic detection and detect the state of the output capacitor based on a history of detection result.

5. A semiconductor integrated circuit device, comprising:

a state detection device, which is disposed in a power supply circuit including a feedback control unit configured to perform a feedback control based on a difference between a feedback voltage corresponding to an output voltage and a reference voltage and an output capacitor configured to smooth the output voltage, the state detection device configured to detect a state of the output capacitor and comprising:

a target value varying unit, configured to increase a target value of the output voltage; and a detector, configured to detect the state of the output capacitor based on a change in the output voltage during a constant discharge time, while the output capacitor is charged when the target value of the output voltage increases, or while the output capacitor is discharged after the target value of the output voltage increases; and at least a part of the power supply circuit;

an internal circuit, configured to receive the output voltage; and an RC circuit, including a resistor and the output capacitor, wherein the internal circuit is configured to be in a stop state during a discharge time, and the detector is configured to detect a capacitance of the output capacitor based on a time constant of the RC circuit.

6. A vehicle, comprising the semiconductor integrated circuit device of claim 5.

* * * * *